(No Model.)

J. HOFFSTADT.
PACKING.

No. 511,734.  Patented Dec. 26, 1893.

Witnesses.  Inventor.
E. K. Sturtevant.  Joseph Hoffstadt
E. M. Amores  By his Attorneys

UNITED STATES PATENT OFFICE.

JOSEPH HOFFSTADT, OF COLOGN-NIPPES, GERMANY, ASSIGNOR TO FRANZ CLOUTH, RHENISH RUBBER MANUFACTORY, OF SAME PLACE.

PACKING.

SPECIFICATION forming part of Letters Patent No. 511,734, dated December 26, 1893.

Application filed November 8, 1892. Serial No. 451,298. (No specimens.) Patented in Germany July 3, 1891, No. 63,419; in France January 14, 1892, No. 218,673; in Belgium January 14, 1892, No. 97,929, and in England January 15, 1892, No. 857.

*To all whom it may concern:*

Be it known that I, JOSEPH HOFFSTADT, a subject of the German Emperor, residing at Cologn-Nippes, in the German Empire, have invented certain new and useful Improvements in Packings, of which the following is a specification.

The invention has been patented in Germany, July 3, 1891, No. 63,419; in France, January 14, 1892, No. 218,673; in Belgium, January 14, 1892, No. 97,929, and in Great Britain, January 15, 1892, No. 857.

This invention relates to an improved construction of elastic packing for the stuffing boxes of cylinders or vessels containing liquid or gaseous substances.

The improved packing is made of cotton material impregnated with caoutchouc, which partly adheres to the surface and forms a thin coating on it. This canvas is rolled and pressed so as to form a V-shaped packing ring, the canvas layers of which are intimately bound together by the adhesion of the caoutchouc coatings of each two canvas surfaces. The caoutchouc is then vulcanized.

The cross section of the compound is so formed that on the one hand the frictional contact surface between the packing and the rod passing through the stuffing box is reduced to a minimum, thereby proportionately reducing the loss of power of the engine or machine due to such friction; while on the other hand annular channels are formed between the packing and the rod in which the liquids collect, which are thereby also made to serve as packing against the escape of gases or vapor, as for example in the case of steam engines, where the condensed steam and lubricating oil would so accumulate, or in the case of gases, the lubricating oil together with combinations thereof with the gases.

Figure 1:
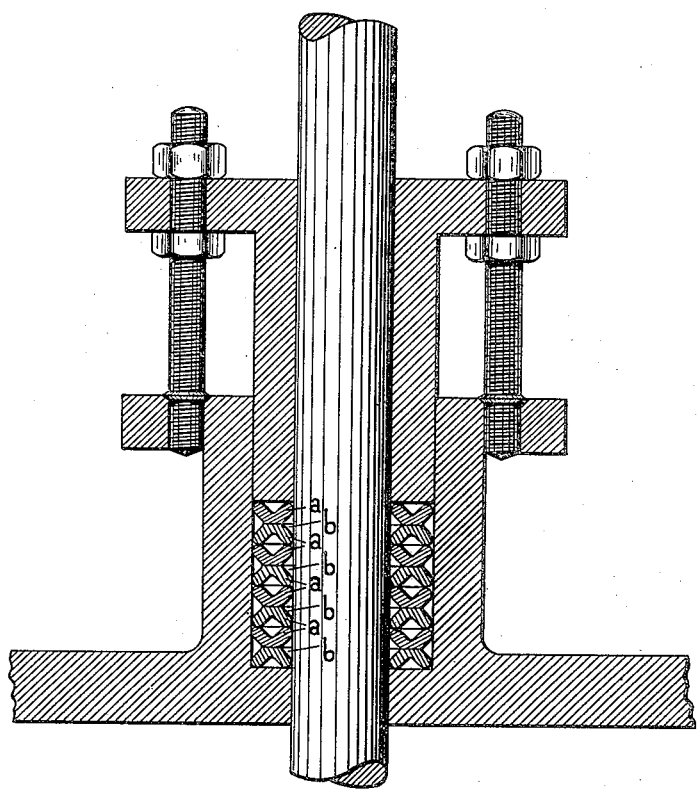
Figure 2:
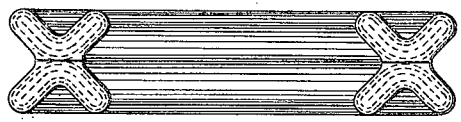

In the accompanying drawings:—Figure 1, shows the application of my improved packing to a stuffing box shown in longitudinal section, while Fig. 2, shows a double packing ring in cross section.

For the manufacture of such packing, strips of thick cotton fabric impregnated with caoutchouc are folded together to form rings as shown at Fig. 2, and are then vulcanized in a mold of the form indicated. The rings are then ready for use, and they are for this purpose packed in the stuffing box in such manner that two of the packing rings together form a cross shaped section such as is shown at *a, b,* on the drawings.

Experiments have shown that the tightening up of the stuffing box screws can readily be effected by hand with this form of packing, while with other packing this always has to be done with a spanner.

For cases where the rings cannot be slid on from the one end of the rod, they are cut through in a slanting direction and then placed round the rod. In this case care must be taken that the joints of successive rings are situated diametrically opposite each other.

From the drawings it will be noticed that the canvas layers extend continuously from one rib of each ring section to the other rib thereof. When the ribs are pressed against the piston rod and wall of the box the tendency is to spread them at their points of contact to make a close tight joint. Especially is this so when the edges of the ribs become slightly worn and the edges of the layers come into direct contact with the adjacent surface. The pressure on the rings then tends to separate the layers and spread them apart over a considerable surface and by reason of the close and broad bearing thus obtained the best results are secured from this packing.

I claim—

A packing ring formed in the shape of a cross in cross section and composed of layers of fabric impregnated with vulcanized caoutchouc, the fabric layers extending longitudinally of the bearing ribs comprising the said ring, said ring being formed of two sections the layers of fabric in each section extending continuously from one rib to the other rib of the same section, substantially as described.

In witness whereof I have hereunto set my hand in presence of two witnesses.

JOS. HOFFSTADT.

Witnesses:
 FRITZ SCHROEDER,
 EVA HAUSEN.